United States Patent [19]

Gaiser

[11] Patent Number: 5,700,434
[45] Date of Patent: Dec. 23, 1997

[54] REACTOR FOR CATALYTICALLY PROCESSING GASEOUS FLUIDS

[76] Inventor: Gerd Gaiser, Lange Äcker 4, D-72768 Reutlingen, Germany

[21] Appl. No.: 325,252

[22] PCT Filed: Apr. 24, 1993

[86] PCT No.: PCT/EP93/00995

§ 371 Date: Oct. 20, 1994

§ 102(e) Date: Oct. 20, 1994

[87] PCT Pub. No.: WO93/22544

PCT Pub. Date: Nov. 11, 1993

[30] Foreign Application Priority Data

Apr. 30, 1992 [DE] Germany .......................... 42 14 579.1

[51] Int. Cl.[6] .................................................. F01N 3/10
[52] U.S. Cl. .......................... 422/173; 422/171; 422/175; 422/177; 422/180; 422/198; 422/206; 422/200; 422/211; 422/222; 165/166; 165/167
[58] Field of Search .......................... 422/171, 173, 422/177, 180, 191, 198, 200, 211, 222, 175, 206; 60/299, 300, 320; 165/165-7

[56] References Cited

U.S. PATENT DOCUMENTS

| | | | |
|---|---|---|---|
| 441,781 | 12/1890 | Theisen | 165/167 |
| 3,779,015 | 12/1973 | Maruoka | 422/173 |
| 3,910,042 | 10/1975 | Yuge et al. | 422/173 |
| 4,017,953 | 4/1977 | Creighton | 165/167 |
| 4,353,208 | 10/1982 | Volker et al. | 422/180 |
| 4,582,044 | 4/1986 | Ferguson et al. | 422/180 |
| 4,867,949 | 9/1989 | Betz | 422/171 |
| 4,912,928 | 4/1990 | Kaneko et al. | 60/320 |
| 5,069,276 | 12/1991 | Seidel | 165/167 |
| 5,118,477 | 6/1992 | Takikawa et al. | 422/180 |

*Primary Examiner*—Robert J. Warden
*Assistant Examiner*—Hien Tran
*Attorney, Agent, or Firm*—Anderson Kill & Olick P.C.

[57] ABSTRACT

A reactor for catalytically processing gaseous fluids. The invention relates to a reactor for catalytically processing gaseous fluids wherein the catalytic reaction is accompanied by a heat exchange, stationary catalysts are used, with the fluid flowing through the reactor in one direction. To this end, the fluid path-forming structures (10) are provided in the reactor housing, the structures (10) form channels (19), and the structures (10) have at least one region (11) provided with a catalyst (12), preferably coated therewith.

8 Claims, 4 Drawing Sheets

REACTOR FOR CATALYTICALLY PROCESSING GASEOUS FLUIDS

The invention relates to a reactor for catalytically processing gaseous fluids in which, along with a catalytic reaction, a heat exchange takes place.

The use of catalysts for purification of outgoing air, e.g., of a solvent-containing industrial air and air used in technical synthesis, is known. The outgoing air is conducted through a reactor in which a catalyst is provided. It is typical for a catalytic oxidation that, on one side, the processed fluid is heated to a predetermined temperature so that a catalytic reaction can take place, and that, on the other hand, during a catalytic reaction, heat is released by an exothermal reaction.

As result, it is necessary to evacuate the released heat to avoid overheating and destruction of the catalyst and to supply heat, especially at the beginning of the reaction.

To this end, it is already become known to provide outgoing air reactors, in which the flow direction is periodically changed. With a high technical output, a particular drawback consists in that, during the change of the flow direction, the air, which remains in the former inlet, is discharged without being purified.

It was also suggested to conduct catalytic purification of the outgoing air in a rotatable catalyzer. At that, the stream of outgoing air due to the rotational movement of the catalyzer, flows through the catalyzer interchangeably radially or axially. However, the use of rotatable parts presents problems from the sealing point of view and, in addition, the change of the flow direction results in creation of so-called dead volume of non-purified air.

Accordingly, a particular object of the present invention is a reactor of the above-mentioned type that would enable a continuous operation without the change of the flow direction.

According to the invention, this object is achieved by so arranging the fluid path-defining elements in the reactor housing that channel-shaped structures having sectionally arranged catalytically acting regions, are formed. It has been found out that with such an arrangement, different temperature zones can be obtained at the same flow direction of the fluid. It is exactly this distribution of the temperature zones is desirable or required for catalytic purification of the outgoing gases.

It was proved to be especially advantageous when the structures have a non-flat outer surface, e.g., a corrugated outer surface, provided with a catalyst only in its middle area, so that both the beginning and end regions have no catalytic regions.

The corrugated structure of plates provides for forming flow channels between respective plates with a very high local heat and mass transfer at the plates.

This effect is advantageously used when, according to the invention, the outgoing air flows through two adjacent channels in accordance with a counterflow principle.

To this end, the fluid flow is divided so that fluid flows in the same direction only in every other channel. Thereby, it is achieved that in the first corrugated plate region, which does not have a catalyst, the heat from air, which has already passed the catalyst and which was heated by an exothermal reaction, is transferred to this plate region, and the air, which has yet to be subjected to the catalytic treatment and which flows in the adjacent channel, is preheated due to heat transfer. In the second corrugated plate region, which likewise does not have a catalyst, the same heat transfer takes place, but in the opposite direction.

In accordance with a further development of the invention, it is contemplated that fluid flows through two respective, connected with each other, adjacent channels so that the reaction heat, which is generated in a fluid stream, can be transferred to the same stream for preheating.

Instead of being sealed, the channels can end in a common collecting channel, with branching therefrom into respective adjacent channels. Such flow configuration results in that the fluid is compulsorily delivered to the reactor at the same pressure.

In an advantageous embodiment of the invention, it is contemplated to provide in the collecting channel a device for extracting and/or addition of heat. Thereby, the thermal content can alternatively be regulated in accordance with the course of the reaction, strong exothermal or less than strong exothermal.

By an appropriate shaping of the plate outer surface, a very high heat and mass transfer between the fluid and the wall is achieved, as well as a predetermined uniform dwell time and a homogeneous mixing in the fluid phase.

The shape of the plate outer surface, in view of the very high heat transfer, is based upon the fact that, e.g. during the catalytic purification of solvent-containing outgoing air, the concentration of harmful material is low and is further reduced by catalysis-generated heat. As a result, a small temperature difference exists between the incoming air and the outgoing air. This leads to a relatively little heating of the air during the reaction and, therefore, to a small temperature difference between the purified air after the reaction and the non-purified air before the reaction.

In order to bring the air, which is admitted into the reactor, to a reaction temperature, the relatively small quantity of heat, which is contained in the outgoing air at small concentration of solvents, should be transferred to the incoming air as completely as possible.

In accordance with the invention, with the above-described autothermal reactor types, the use of strong exothermal or strong endothermal reactions, a uniform heat addition or heat extraction is necessary because, otherwise, the catalyst is destroyed or, when endothermal reaction takes place, quenching of the reaction takes place. Further, according to the invention, additional heating and/or cooling channels are contemplated in addition to the already described fluid path-defining structures. These are advantageously provided between two respective fluid paths.

The constructional forms are adapted to particular requirements, e.g., for autothermal operation, the outer surfaces of the heat receiving and heat releasing zones can, for a different heat and mass transfer, be layed out as reaction zone.

According to a further advantageous embodiment of the invention, it is contemplated to displace the described plates relative to each other so that adjacent plates form contacting each other opposite wave-shaped structures. The wave-shaped structures can have different height dimensions and can be spaced from each other a different distance.

It can also be very advantageous to use plates having opposite orientation so that the plates support each other. With this construction, the best results are achieved.

Further advantageous solutions are apparent from the subclaims.

BRIEF DESCRIPTION OF THE DRAWINGS

The invention will now be explained in detail with reference to several embodiment examples and respective accompanying drawings. It is shown in:

FIG. 1 shows a reactor for catalytic processing of gaseous fluids. For the sake of clarity, here and in further figures, the reaction housing is not shown.

Figure 1:
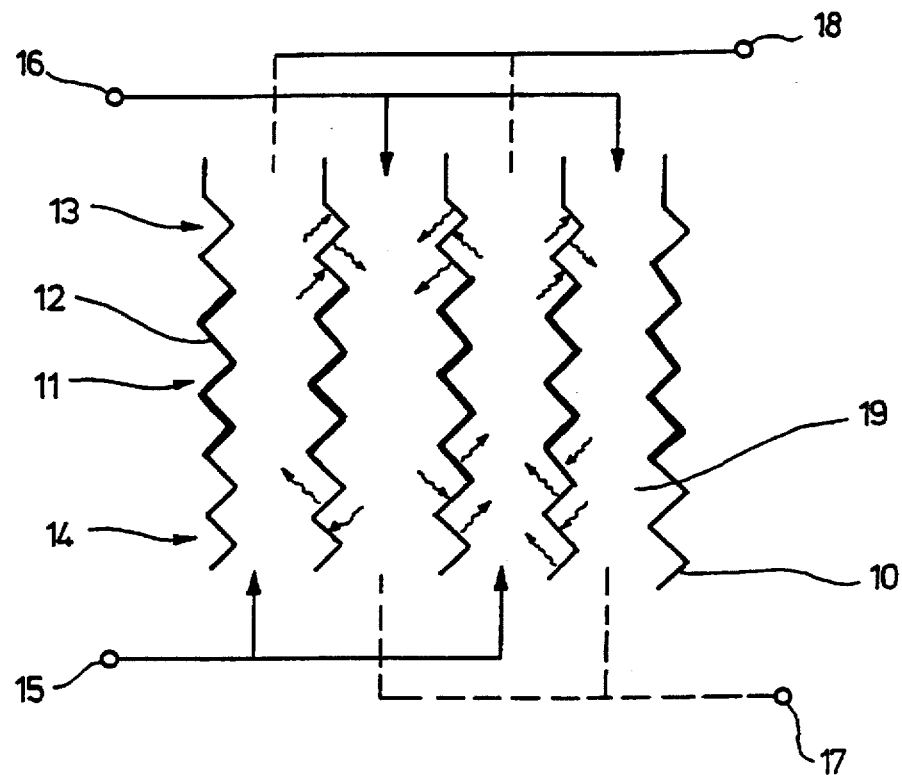
FIG. 1 a single-path reactor.

A plurality of plates 10, which have a corrugated structure, are arranged parallel to each other and define channels 19. The plates 10 have a region 11 in which the opposite sides of plates are provided with a catalyst 12, e.g., are coated. In addition, the plates 10 have regions 13 and 14, which are not provided with the catalyst, that is, they do not have any coating. For delivering fluid, an inlet 15 and an inlet 16 and, for carrying away the products of the reaction, an outlet 17 and an outlet 18 are provided.

The reactor functions as follows:

The fluid, which is delivered through the inlet 15, is so divided that it flows in the same direction only through every other channel 19. The fluid, which is delivered through the inlet 16, likewise flows through every other channel 19. Thus, a counterflow is provided in two adjacent channels 19. When the fluid passes through the region 11, provided, e.g., covered with a catalyst 12, a catalytic reaction takes place. During this reaction, the heat is released which is transferred to the fluid. When the fluid then passes through the region 13, the heat is transferred to the plates 10. When a non-processed and, thus, cold fluid flows in the adjacent channel 19, it takes up the heat. So pre-heated fluid enters the reaction zone of its channel 19 and there is catalytically processed. Due to the exothermal reaction, the fluid is heated further and then gives up the heat to the plates 10 in the region 14.

Because of the alternate flow of fluid in channels 19, an autothermal process takes place. Thus, each flow channel has regions with different functions: in the first portion, the fluid is heated up, the fluid reacts in a middle portion and in a third portion, gives up heat to a fluid in the adjacent channels. Thereby, it is insured that the fluid is preheated to a respective pre-reaction temperature. At the first activation of the reactor, an additional, single time, preheating of the fluid may be required.

The heat flow in the plates can be changed and thereby influenced by selection of the plate thickness, plate material, and the configuration of the outer surface of a plate.

Also, it is possible in a manner not shown here, to so equip, e.g., cover the plates 10 with the catalyst 12, that regions with different temperatures and, therefore, different functions, (heating, catalytic reaction, cooling) are provided. When, e.g., a certain time period is required for heating the fluid, then the first region is cooler, and in the last region, which is also covered with the catalyst, no further heating takes places, as due to the already taken place catalytic reaction, no heat transformation takes place in the purified fluid.

Figure 2:
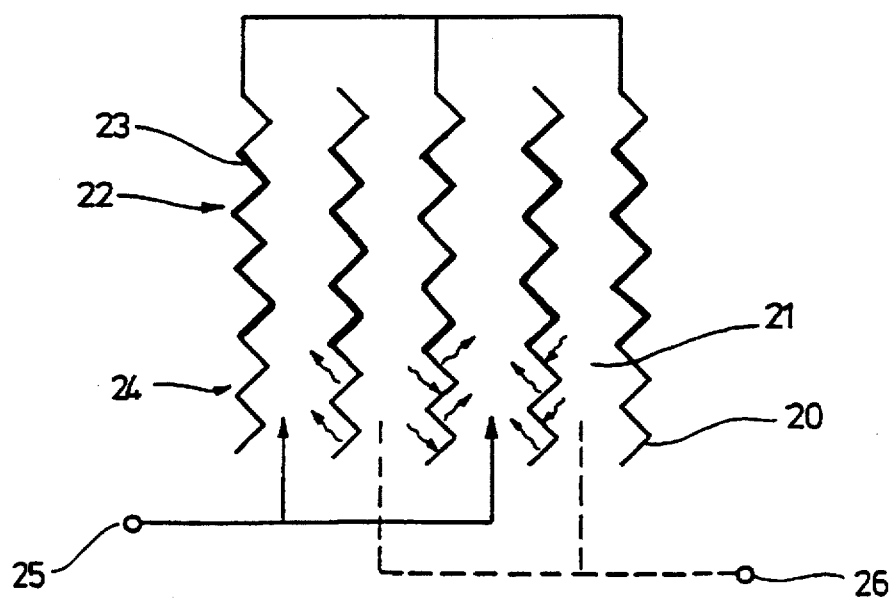
FIG. 2 a double-path reactor.

FIG. 2 shows another embodiment of the reactor. Here, likewise several plates 20, having corrugated structure, are arranged parallel to each other and form channels 21. The plates 20 have a region 22, with the opposite sides of the plates 20 being provided, e.g., coated with the catalyst 23, and a region 24, with no coating. Two respective non-adjacent plates 20 are connected with each other so that two channels 24 surround a coherent bent reaction space. The reactor has an inlet 25 for the fluid and an outlet 26 for the products.

The reactor functions as follows:

The fluid is delivered to the reactor through the inlet 25 and is divided so that it flows in every other channel 21. In the region 22 of the plates 20, a catalytic reaction takes place. This reaction takes place during flow of fluid in both directions, up and down. The fluid, which was heated by the exothermal reaction, gives up heat to the plates 20 in the region 24 when flowing downward. The heat, which was released in the region 24 is transferred to the upwardly flowing fluid in the adjacent channel 21, whereby this fluid is pre-heated to a desired pre-reaction temperature.

Figure 3:
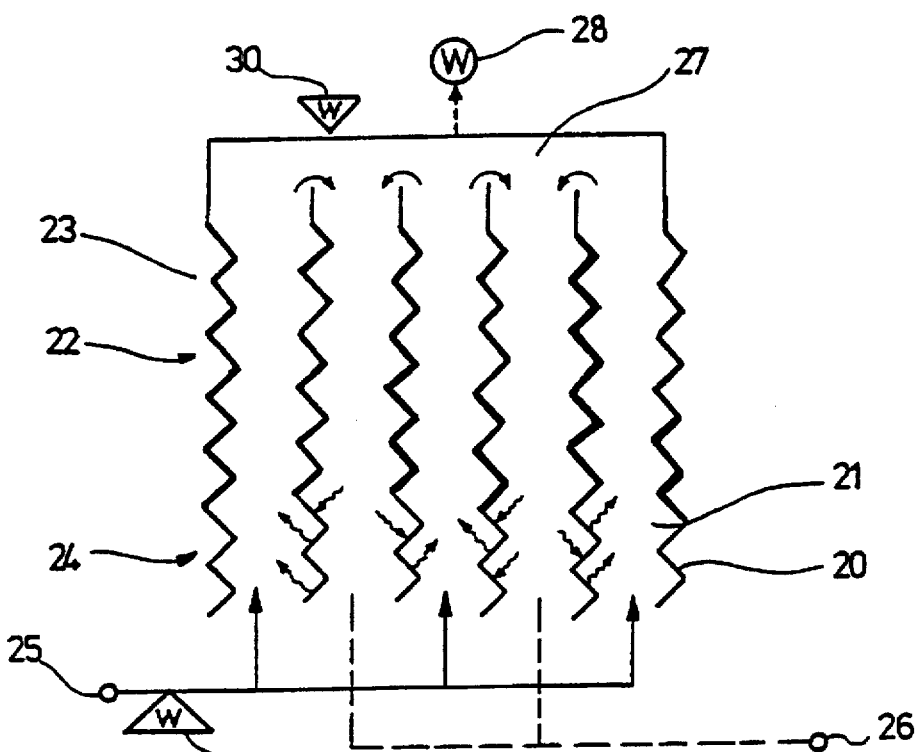
FIG. 3 a double-path reactor with a collecting channel.

FIG. 3 shows a further embodiment of the reactor. This reactor, contrary to that shown in FIG. 2, instead of the connection of two non-adjacent plates 20, has a collecting channel 27. The channels 21 open into this collection channel, whereby the fluid can flow back through different channels.

In the embodiment shown here, an offtake 28 is provided in the collecting channel 27 for conducting heat energy away. Thereby, it is possible to carry away an excessive heat energy generated during strong exothermal catalytic reaction. However, the heat carrying away is effected so that a sufficiently large amount of the heat energy remains for heating of the plates 20 in the region 24.

In addition, two external pre-heating devices 29 and 30 are provided. These pre-heating devices are necessary for an initial activation of the reactor for pre-heating the fluid to the required reaction temperature. To this end, alternatively, the pre-heating device 29 is provided at the fluid inlet, and the pre-heating device 30 is provided in the collecting channel 27.

The above-described embodiment examples are layed out for an autothermal operation.

Figure 4:
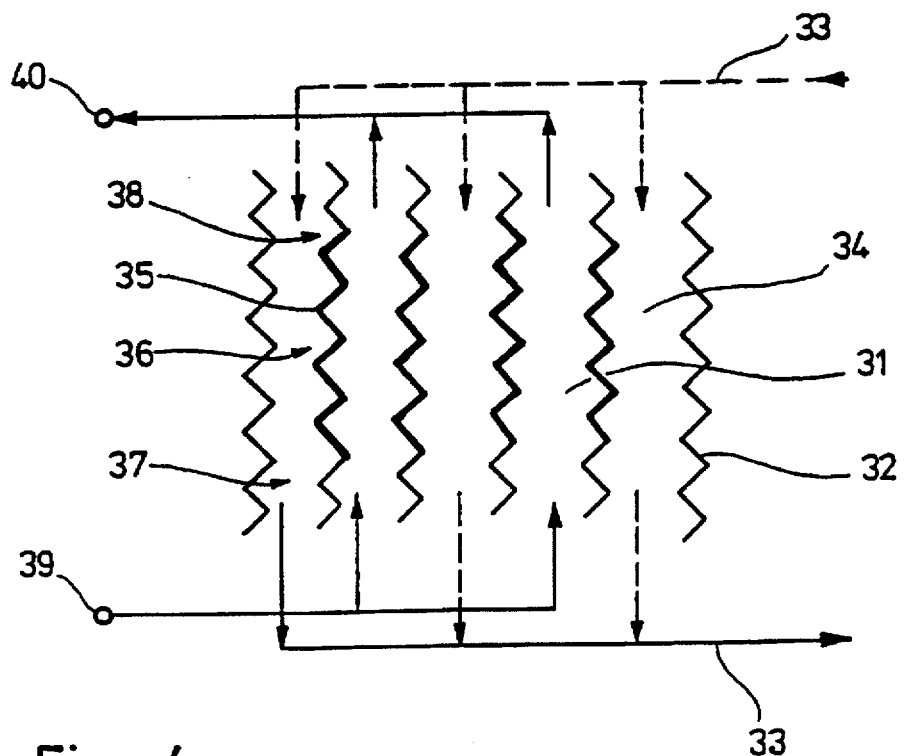
FIG. 4 a reactor with additional heating and cooling channels.

FIG. 4 shows an embodiment of a reactor which is used at both strong exothermal and strong endothermal reactions. Here, channels 34, which are formed by pairs of respective plates 32 defining a reaction space 31, form part of a cooling or heating circuit 33. The plates 32 have a region 36, coated with a catalyst 35, and lower and upper regions 37 and 38, which are not coated.

The plates 32 are coated with the catalyst only on the side thereof facing the reaction path.

The reactor functions as follows:

The fluid is delivered to the reactor through the inlet 39 and is conducted into the reaction space 31. There, the fluid is subjected to the already described catalytic reaction in the region 36 and is carried away through the outlet 40 dependent upon whether strong exothermal or strong endothermal catalysis takes place, cooling or heating medium is conducted through the channels 34. This results in heat being supplied into or carried away from the reaction space 31. Thereby, the catalytic reaction is balanced. The regions 37 and 38 form, in this embodiment, already mentioned heating or cooling zones for the fluid.

In another, not shown, embodiment example, the regions 37 and 38, which are not provided, e.g., are not coated with a catalyst, can be dispensed with, so that the plates 32 are coated with the catalyst 35 along their entire length. The cooling or heating then provided by the medium that flows through the channels 34.

Figure 5:
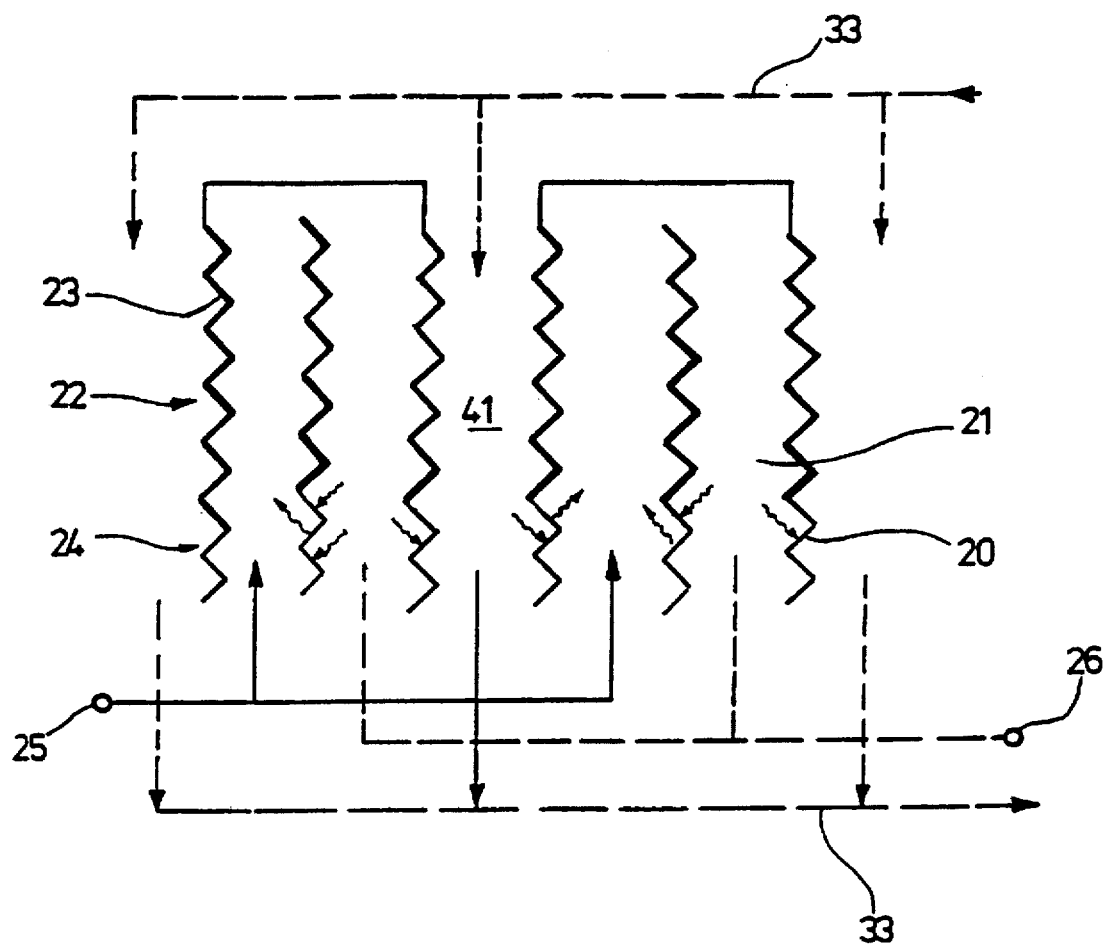
FIG. 5 a further reactor with heating and cooling channels.

Another embodiment of the reactor is shown in FIG. 5. Here, the construction shown in FIG. 2 is combined with a cooling or heating circuit 33. Thus, it is possible to use a longest possible reaction path and thereby to extract additional heat or to add additional heat, if needed.

Figure 6:
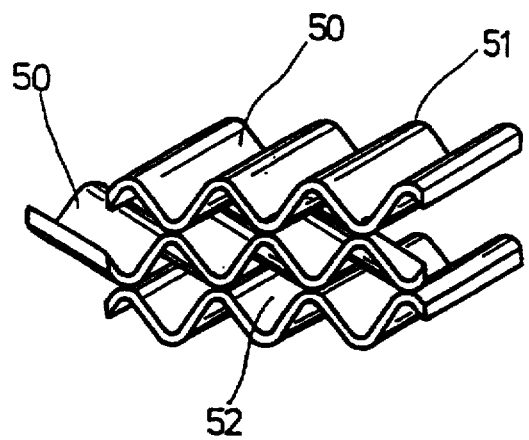
FIG. 6 a variant of a plate arrangement.
Figure 7:
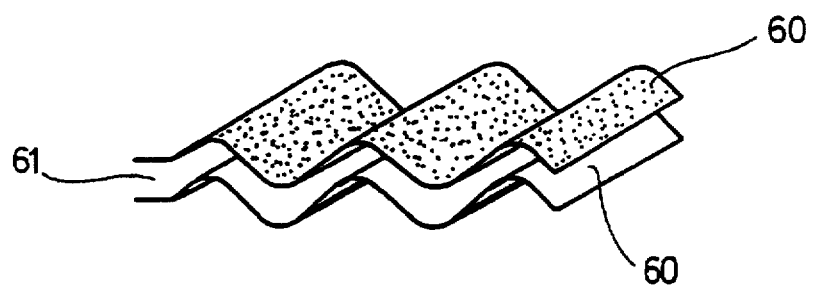
FIG. 7 a further variant of the plate arrangement.
Figure 8:
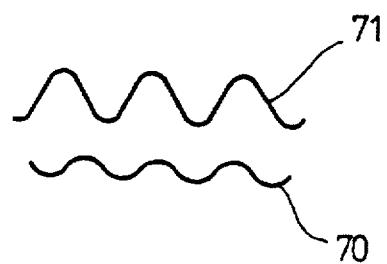
FIG. 8 a variant of a plate construction.

FIGS. 6–8 show different plate arrangements which do not depend on general construction of the reactor.

FIG. 6 shows a perspective view of a plate arrangement.

It is apparent that the plate 50 are alternatively arranged at an angle one above the other. The plates 50 are supported here on their bulging 51 defining the corrugated structure.

Such an optimal support simultaneously provides for good stability, even with very thin walls. Because the thin walls insure good heat conductivity, an optimal construction is thereby obtained.

The plates 50 form channels 52. The channel 52, because of the bulgings 51, do not extend at the same level. These obstructions lead to an increased turbulence in the fluid stream and/or in the stream of cooling or heating medium and, as a result, in a better performance of the whole apparatus.

As a displacement angle, an angle between 0° and 90° can be used.

Further, as FIG. 7 shows, it is possible to arrange the corrugated structures so that they are located one beneath the other. The plates 60 are so arranged that they form a through channel 61. Between the plates, there are provided additional supports (not shown).

As further shown in FIG. 8, it is advantageous when the plates 70 and 71 have a different shape and differ from each other in height and form corrugated structures with a different spacing between corrugation.

The invention is not limited to the shown embodiments, but rather relates to all catalyst-containing reactors the heating and/or cooling zones of which can be associated with the processed fluid.

It is also within the scope of the invention, when the shown catalyst regions 11, 22, 36 are not continuously provided with a catalyst, coated therewith, but also have catalyst-free regions. Thereby, a more precise heating during conducting the entire process is possible.

Generally, it is possible to provide the fluid paths with a catalyst in any arbitrary manner. For example, the coating of the walls with a catalyst mass can be eliminated and instead, a catalyst-covered structure, e.g., a grid, or a catalyst in bulk can be provided in the fluid path.

What is claimed is:

1. A reactor for catalytically processing gaseous fluids, comprising:

a plurality of fluid path-forming elements spaced from each other to form a plurality of alternatively arranged first channel means and second channel means through which fluid flows in opposite direction, each of said first and second channel means having inlet and outlet regions, wherein at least the inlets of said first channel means and at least the outlets of the second channel means are without catalyst, and wherein each of said first channel means and said second channel means have at least one region other than the inlet and outlet region thereof provided with a catalyst, with the inlet regions of the first channel means and the outlet regions of the second channel means providing for heat exchange between adjacent first and second channel means; and means for feeding fluid to inlet regions of said first channel means and for discharging fluid from the outlet regions of said second channel means.

2. A reactor according to claim 1, wherein the fluid-path forming elements are formed as plates having non-flat surfaces.

3. A reactor according to claim 1, wherein the feeding and discharging means includes a fluid inlet, and wherein the reactor further comprises pre-heating means arranged in the fluid inlet.

4. A reactor according to claim 1, wherein the fluid path forming elements are formed as plates extending parallel to each other, and wherein the first and second channel means form part of at least one of a cooling circuit and a heating circuit.

5. A reactor according to claim 1, wherein the fluid path-forming elements are formed as plates, and wherein the region provided with a catalyst is located on one side of the plate.

6. A reactor according to claim 2, wherein the plates have a wave structure.

7. A reactor according to claim 6, wherein wave crests of the adjacent plates project in opposite directions so that the plates support each other and form the plurality of first and second channel means.

8. A reactor according to claim 6, wherein the wave structure is formed as a corrugated structure having different dimensions in at least one of height and spacing.

* * * * *